United States Patent
Tai et al.

(10) Patent No.: US 7,058,304 B2
(45) Date of Patent: Jun. 6, 2006

(54) BI-DIRECTIONAL CROSS-CONNECT

(75) Inventors: Kuochou Tai, Fremont, CA (US); Kok-Wai Chang, Los Altos, CA (US); Jyehong Chen, San Jose, CA (US)

(73) Assignee: JDS Uniphase Corporation, San Jose, CA (US)

( * ) Notice: Subject to any disclaimer, the term of this patent is extended or adjusted under 35 U.S.C. 154(b) by 829 days.

(21) Appl. No.: 09/931,752

(22) Filed: Aug. 20, 2001

(65) Prior Publication Data

US 2002/0076144 A1 Jun. 20, 2002

Related U.S. Application Data

(63) Continuation-in-part of application No. 09/645,459, filed on Aug. 24, 2000.

(51) Int. Cl.
H04B 10/24 (2006.01)
H04B 10/00 (2006.01)
H04J 14/00 (2006.01)
H04J 14/06 (2006.01)
G02B 27/28 (2006.01)

(52) U.S. Cl. .............. 398/65; 398/41; 398/50; 398/56; 398/152; 359/497

(58) Field of Classification Search ............. 398/45, 398/48–51, 54, 56, 79, 82, 83, 84, 85, 41–43, 398/65, 152; 359/497
See application file for complete search history.

(56) References Cited

U.S. PATENT DOCUMENTS

| | | | | |
|---|---|---|---|---|
| 4,461,543 A | * | 7/1984 | McMahon | 359/320 |
| 6,208,444 B1 | * | 3/2001 | Wong et al. | 398/9 |
| 6,381,049 B1 | * | 4/2002 | Xu et al. | 398/82 |
| 6,463,189 B1 | * | 10/2002 | Wu et al. | 385/16 |

* cited by examiner

*Primary Examiner*—M. R. Sedighian
(74) *Attorney, Agent, or Firm*—Hall, Vande Sande & Pequignot

(57) ABSTRACT

Wavelength interleaving cross-connects pass a first optical signal including a first set of optical frequencies in a first direction and a second optical signal including a second set of optical frequencies in a second direction. In one embodiment, the first optical signal, when input to a first input/output (I/O) port, is routed from the first I/O port to a third I/O port. The first optical signal, when input to a fourth I/O port, is routed from the fourth port to a second I/O port. The second optical signal, when input to the second I/O port, is routed from the second I/O port to the third I/O port. The second optical signal, when input to the fourth I/O port, is routed from the fourth I/O port to the first I/O port. Thus, by coupling an optical device (e.g., amplifier, filter) between the third port and the fourth port, the optical device can be used for bi-directional communications thereby reducing the number of devices required for a bi-directional optical network architecture.

16 Claims, 13 Drawing Sheets

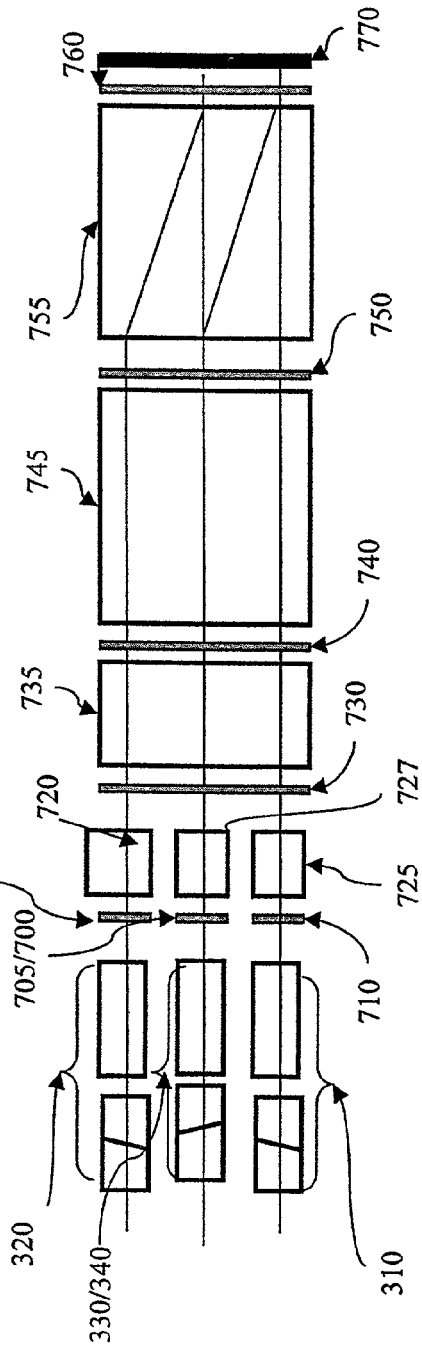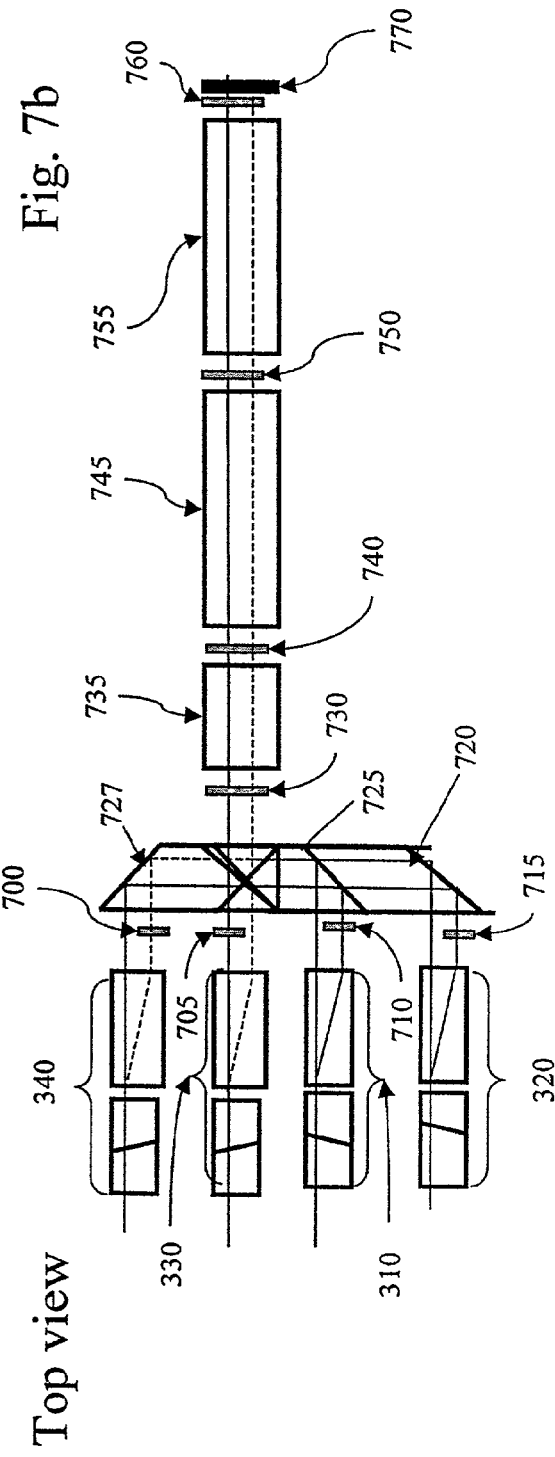

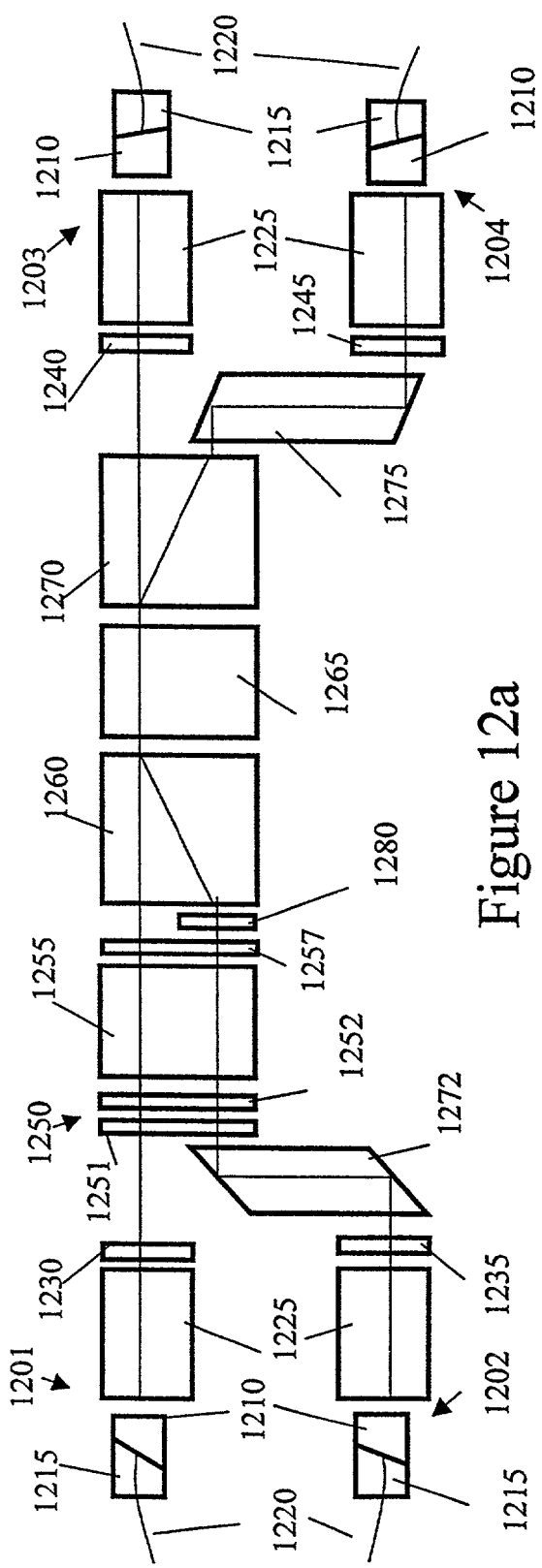
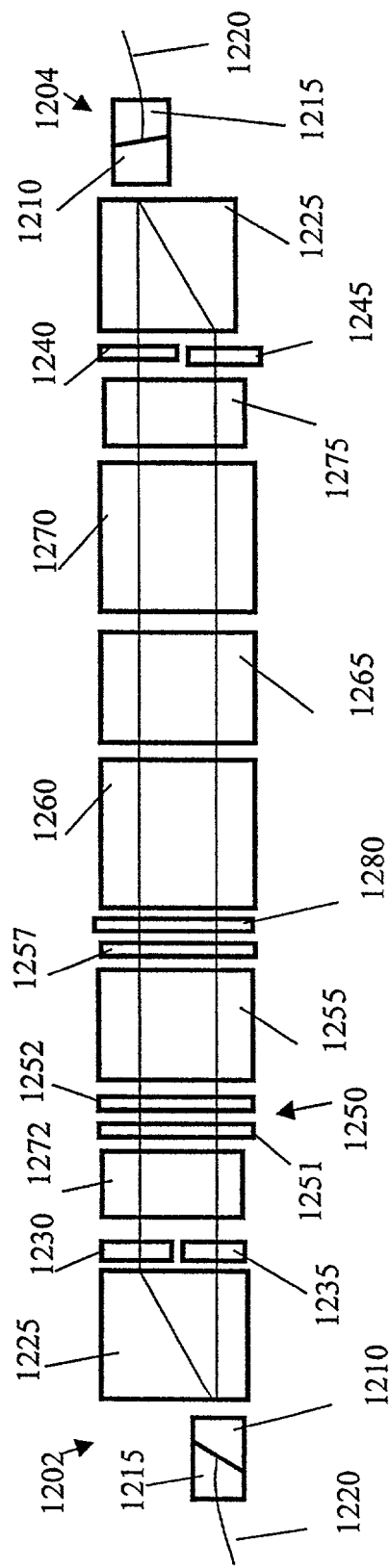
Figure 12a
Figure 12b

BI-DIRECTIONAL CROSS-CONNECT

RELATED APPLICATIONS

The present U.S. Patent application is a continuation in part of U.S. patent application Ser. No. 09/645,459 entitled Wavelength-Interleaving Cross-Connect filed Aug. 24, 2000.

FIELD OF THE INVENTION

The invention relates to optical devices including cross-connects, and in particular to optical devices including bi-directional cross-connects.

BACKGROUND OF THE INVENTION

For long-distance communications using optical fibers, amplifiers are used to boost signals along an optical path. Because amplifiers are one-way devices, two fibers with associated amplifiers are required for bi-directional communications using optical fibers. One common format for use with fiber optics communications is use of International Telecommunications Union (ITU) channels that define frequency spacing for multiplexed optical signals.

FIG. 1 illustrates one embodiment of bidirectional transmission of multiple optical channels using two optical fibers. Optical signals are transmitted from multiple transmitting devices 100 to multiple receiving devices 140 and from transmitting devices 150 (which can be devices 140) to receiving devices 180 (which can be devices 100).

When transmitting from devices 100, the optical signals are multiplexed by multiplexor 110 to generate a wavelength division multiplexed (WDM) or dense WDM (DWDM) optical signal. The WDM/DWDM optical signal is transmitted to amplifier 120, where the signal is strengthened and forwarded to amplifier 122. The sequence of amplification continues as necessary until the signal is received by demultiplexor 130. Amplification of transmitted optical signals is known in the art. Demultiplexor 130 demultiplexes the optical signal and distributes the signals to devices 140.

Optical signals transmitted from devices 150 to devices 180 are transmitted in a similar manner. The optical signals are multiplexed by multiplexor 190 to create a WDM or DWDM optical signal. The signal is transmitted via optical fiber to amplifiers 160 and 162 to demultiplexor 170. Demultiplexor 170 demultiplexes the WDM/DWDM optical signal and distributes the optical signals to devices 180. The bidirectional network of FIG. 1 requires two sets of multiplexors, demultiplexors, amplifiers, fibers and related interconnections and is thus inefficient network architecture.

FIG. 2 illustrates one embodiment of bidirectional transmission of multiple optical channels using circulators and interleaving filters. In the architecture of FIG. 2 a first set of optical frequencies (e.g. even ITU channels) are communicated in a first direction and a second set of optical frequencies (e.g. odd ITU channels) are communicated in the opposite direction.

A WDM or DWDM signal is transmitted to circulator 210 via optical fiber 200. Circulator 210 routes the optical signal to amplifier 220. Amplifier 220 amplifies the signal, and filter 230 filters the amplified signal. Amplifier 225 further amplifies the optical signal. The filtering and amplification are performed as necessary based on, for example, fiber length and/or signal conditions. The optical signal is eventually routed to circulator 240.

Circulator 240 routes the optical signal from amplifier 225 to optical fiber 250, which carries the optical signal to one or more receiving devices (e.g. a demultiplexor). For optical signals traveling in the opposite direction, optical fiber 250 carries signals from a transmitting device (e.g. a multiplexor) to circulator 240, which routes the optical signal from fiber 250 to amplifier 260. Amplifier 260, filter 270 and amplifier 265 amplify and filter the optical signal as necessary, and direct the optical signal to circulator 210.

Circulator 210 routes optical signals from amplifier 265 to optical fiber 200. Optical fiber 200 carries the optical signal to a receiving device (e.g. a demultiplexor). The network architecture of FIG. 2, as with the network architecture of FIG. 1, requires two sets of amplifiers. The network architecture of FIG. 2 also requires two sets of filters and at least two circulators. The network of FIG. 2 is can be more efficient than the network architecture of FIG. 1; however, the network architecture of FIG. 2 can be expensive to build and to maintain.

BRIEF DESCRIPTION OF THE DRAWINGS

The invention is illustrated by way of example, and not by way of limitation, in the figures of the accompanying drawings in which like reference numerals refer to similar elements.

FIGS. 7a and 7b illustrate one embodiment of a wavelength interleaving cross-connect having all four ports on a common side and a reflective element to reflect optical signals through multiple half wave plates and multiple birefringent elements.

FIG. 12a and 12b illustrate an embodiment of the cross connect of FIG. 11.

DETAILED DESCRIPTION

Wavelength interleaving cross-connects are described in the following description. For purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Wavelength interleaving cross-connects pass a first optical signal including channels from a first set of optical frequencies in a first direction and a second optical signal including a second set of optical frequencies in a second direction. In one embodiment, the first optical signal, when input to a first input/output (I/O) port, is routed from the first I/O port to a second I/O port. The first optical signal, when input to a third I/O port, is routed from the third port to a fourth I/O port. The second optical signal, when input to the fourth I/O port, is routed from the fourth I/O port to the first I/O port. The second optical signal, when input to the third I/O port, is routed from the third I/O port to the second I/O port. Thus, by coupling an optical device (e.g., amplifier, filter) between the second port and the fourth port, the optical device can be used for bidirectional communications thereby reducing the number of devices required for a bi-directional optical network architecture.

For simplicity of description the wavelength interleaving cross-connects described herein are described in terms of filtering and routing even and odd ITU channels; however, the sets of optical frequencies filtered and routed can be those other than ITU channels.

Figure 1:
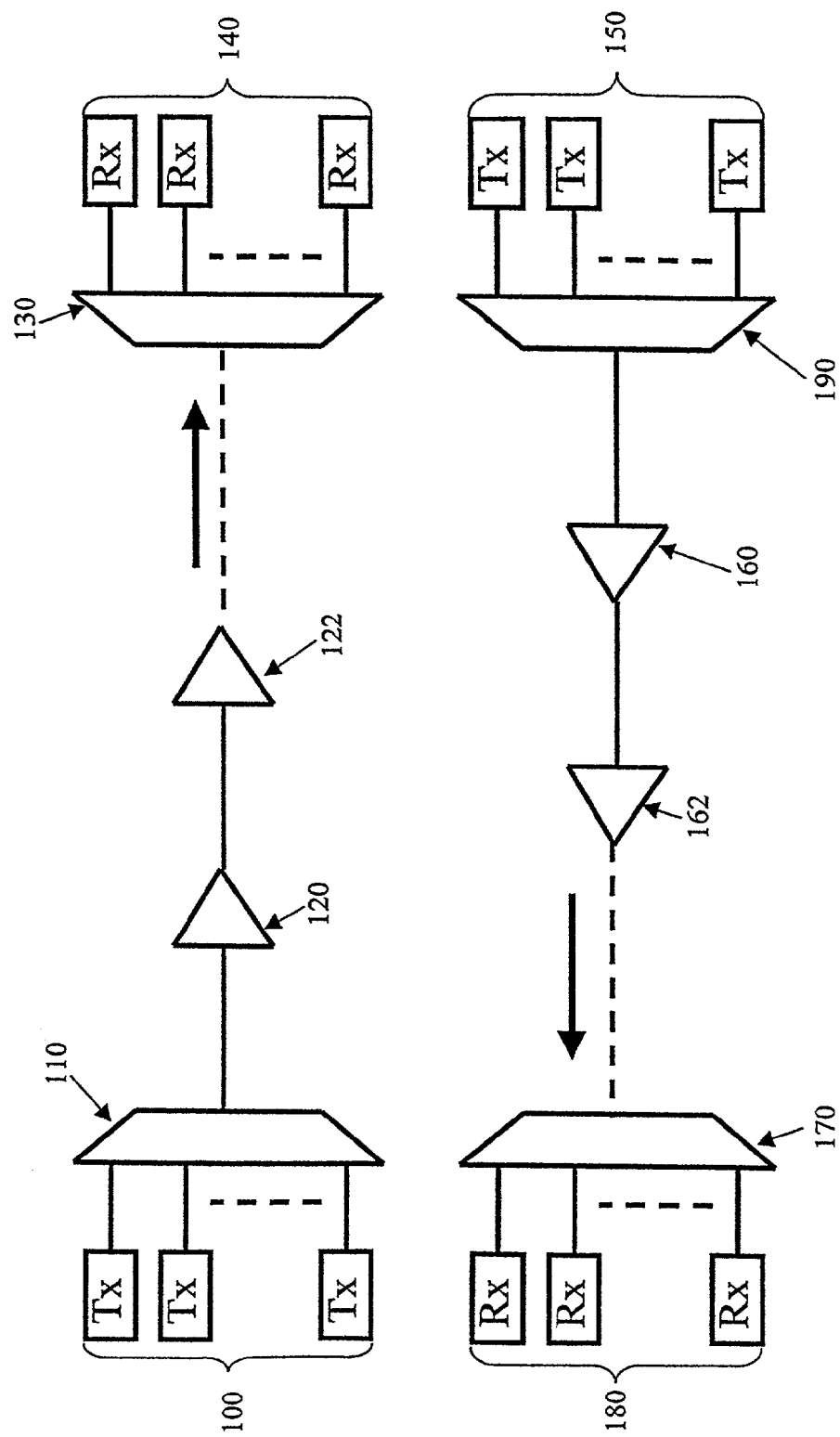
FIG. 1 illustrates one embodiment of bi-directional transmission of multiple optical channels using two optical fibers.
Figure 2:
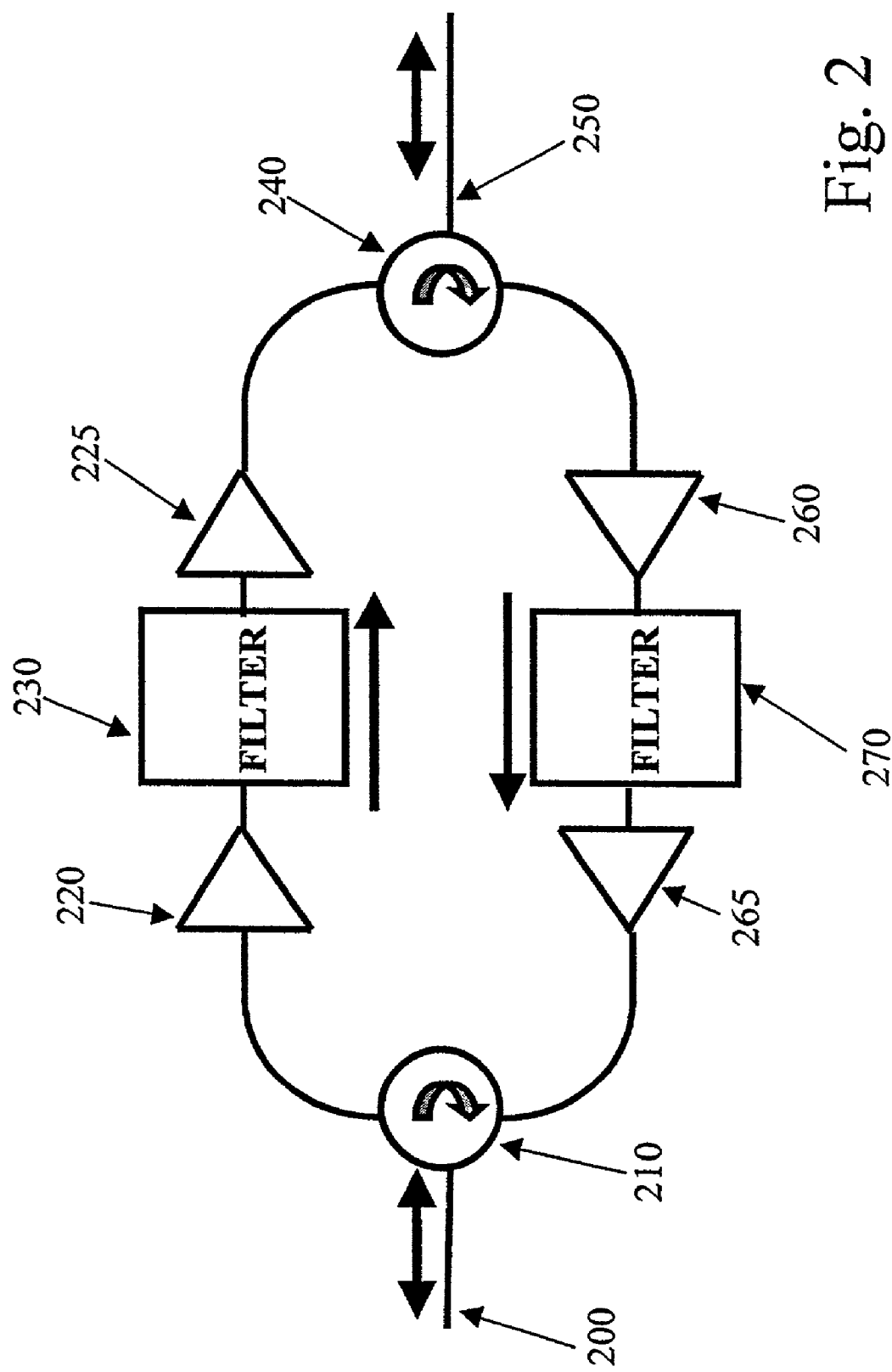
FIG. 2 illustrates one embodiment of bi-directional transmission of multiple optical channels using circulators and interleaving filters.
Figure 3:
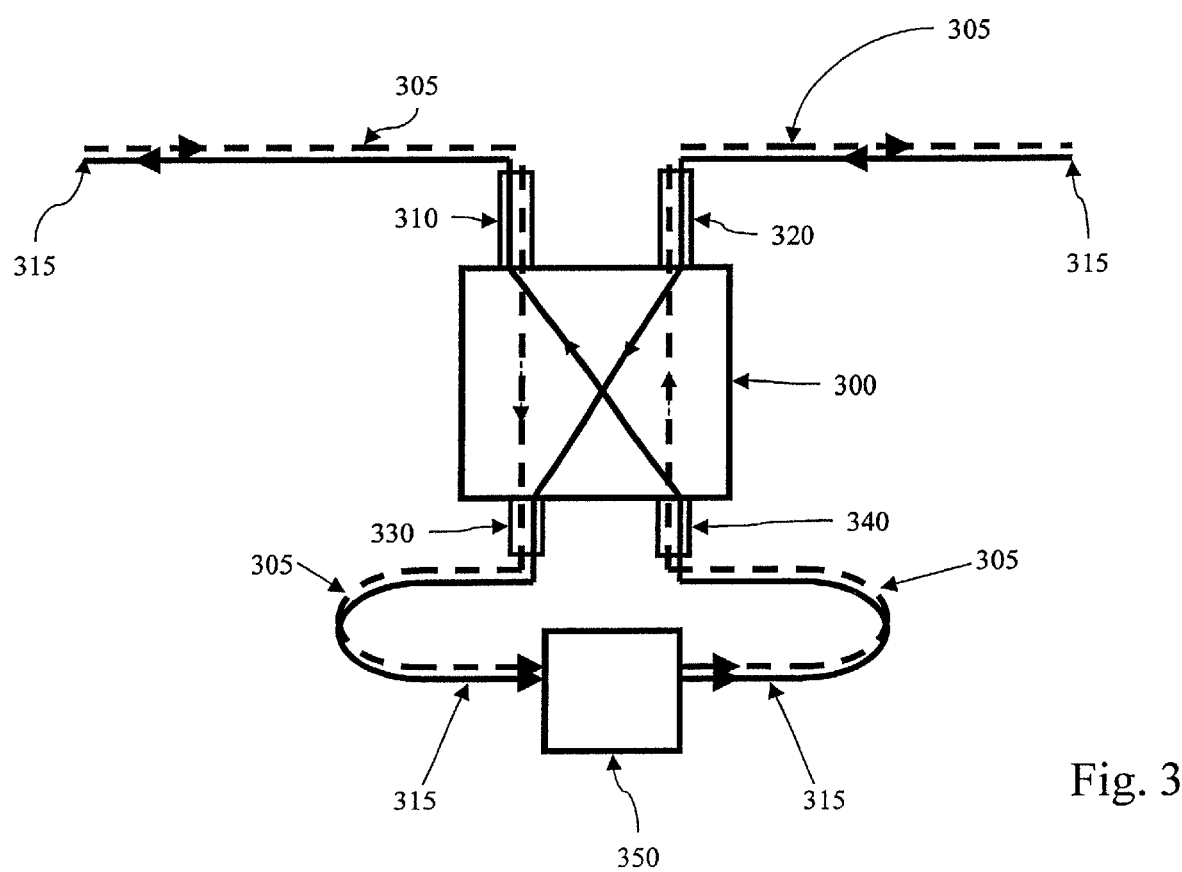
FIG. 3 illustrates one embodiment of a block diagram of a wavelength interleaving cross-connect coupled to another optical device.

FIG. 3 illustrates one embodiment of a block diagram of a wavelength interleaving cross-connect coupled to another optical device. One or more devices (not shown in FIG. 3) transmit a first optical signal 305 having a first set of optical frequencies (e.g., odd ITU channels). One or more optical devices (not shown in FIG. 3) receive a second optical signal 315 having a second set of optical frequencies (e.g., even ITU channels). In one embodiment, odd channels 305 and even channels 315 are carried by a single optical fiber. The transmitting devices and the receiving devices can be the same device or different devices.

The optical fiber carrying odd channels 305 and even channels 315 is optically coupled to I/O port 310. In one embodiment, port 310 is a collimator assembly having a graded index (GRIN) lens to collimate the light. Other types of lenses can also be used, or pre-collimated light can be received. Port 310 is optically coupled to wavelength interleaving cross-connect 300.

One or more devices (not shown in FIG. 3) receive odd channels 305 and transmit even channels 315 via port 320 that is optical coupled to wavelength interleaving cross-connect 300. The transmitting devices and the receiving devices can be the same device or different devices. In one embodiment, port 320 is a collimator assembly having a GRIN lens to collimate the light. Other types of lenses can also be used, or pre-collimated light can be received.

I/O ports 330 and 340 are also optically coupled to wavelength interleaving cross-connect 300. In one embodiment, ports 330 and 340 include collimator assemblies having GRIN lenses to collimate the light. Other types of lenses can also be used, or pre-collimated light can be received.

Optical device 350 is optically coupled between port 330 and 340. Optical device 350 can be, for example, a channel equalizer, a filter, a repeater, an Erbium-Doped Fiber Amplifier (EDFA), a Semiconductor Optical Amplifier (SOA), a Rare Earth Doped Fiber Amplifier (REDFA) or other optical device.

The odd channels 305 (dashed line) input to wavelength interleaving cross-connect 300 via port 310 and routed to port 330. The odd channels 305 are then input to optical device 350. The odd channels 305 as output by optical device 350 are carried to port 340 by an optical fiber or other waveguide. The wavelength interleaving cross-connect 300 routes odd channels 305 from the port 340 to the port 320.

The even channels 315 (solid line) are input to the wavelength interleaving cross-connect 300 via the port 320 and routed to the port 330. The even channels 315 are then carried to the optical device 350. The even channels 315 as output by the optical device 350 are carried to the port 340 by a suitable optical waveguide. The wavelength interleaving cross-connect 300 routes the even channels 315 from the port 340 to the port 310.

Because both the even channels 315 and the odd channels 305, which represent bidirectional communications, are routed from their respective input ports to the port 330, a single optical device (i.e., optical device 350) can be used for bi-directional communications. The even channels 315 and the odd channels 305 received from the optical device 350 via the port 340 are routed to the respective output ports to provide bi-directional communications. Thus, the number of optical devices (e.g. amplifiers), needed for bidirectional communications, can be reduced by as much as half.

Figure 4:
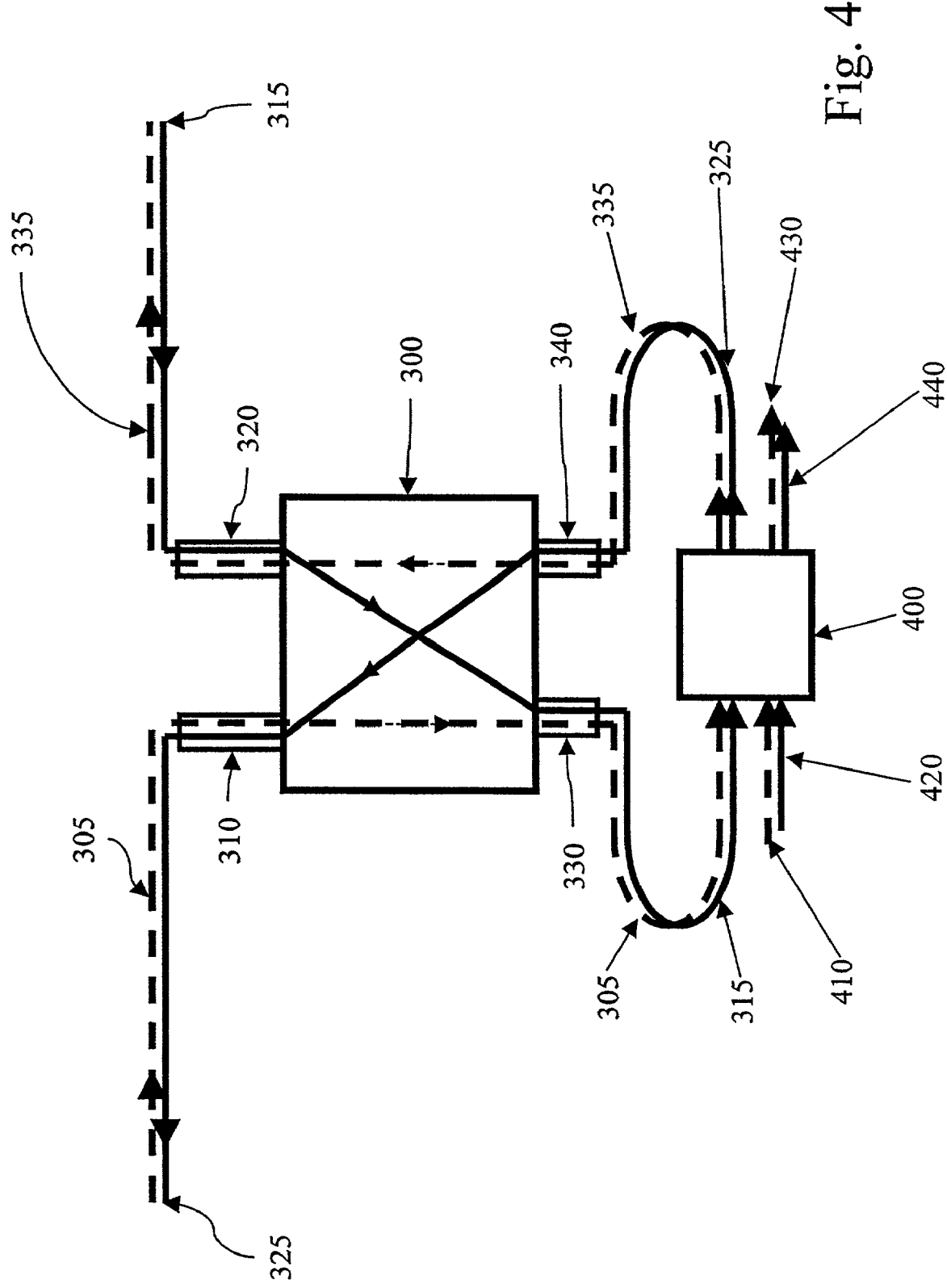
FIG. 4 illustrates one embodiment of a block diagram of a wavelength interleaving cross-connect coupled to an add/drop device.

FIG. 4 illustrates one embodiment of a block diagram of a wavelength interleaving cross-connect coupled to an add/drop device. The wavelength interleaving cross-connect 300 and the ports 310, 320, 330 and 340 operate in a similar manner as described above with respect to FIG. 3.

An add/drop device 400 is coupled between the ports 330 and 340. The add/drop device 400 receives the odd channels 305 and the even channels 315 from the port 330 of the wavelength interleaving cross-connect 300. The add/drop device 400 includes one or more filters to filter one or more channels from the optical signals received. The add/drop device 400 also receives the odd channels 410 and the even channels 420 from a device (not shown in FIG. 4) generating or transmitting the signals. One or more of the odd channels 410 and the even channels 420 can be added to the even channels 305 and the odd channels 315 to provide new even channels 325 and odd channels 335 that are routed to the port 340 of the wavelength interleaving cross-connect 300. Dropped channels that have been filtered by the add/drop device 400 are illustrated as odd channels 430 and even channels 440.

Figure 5:
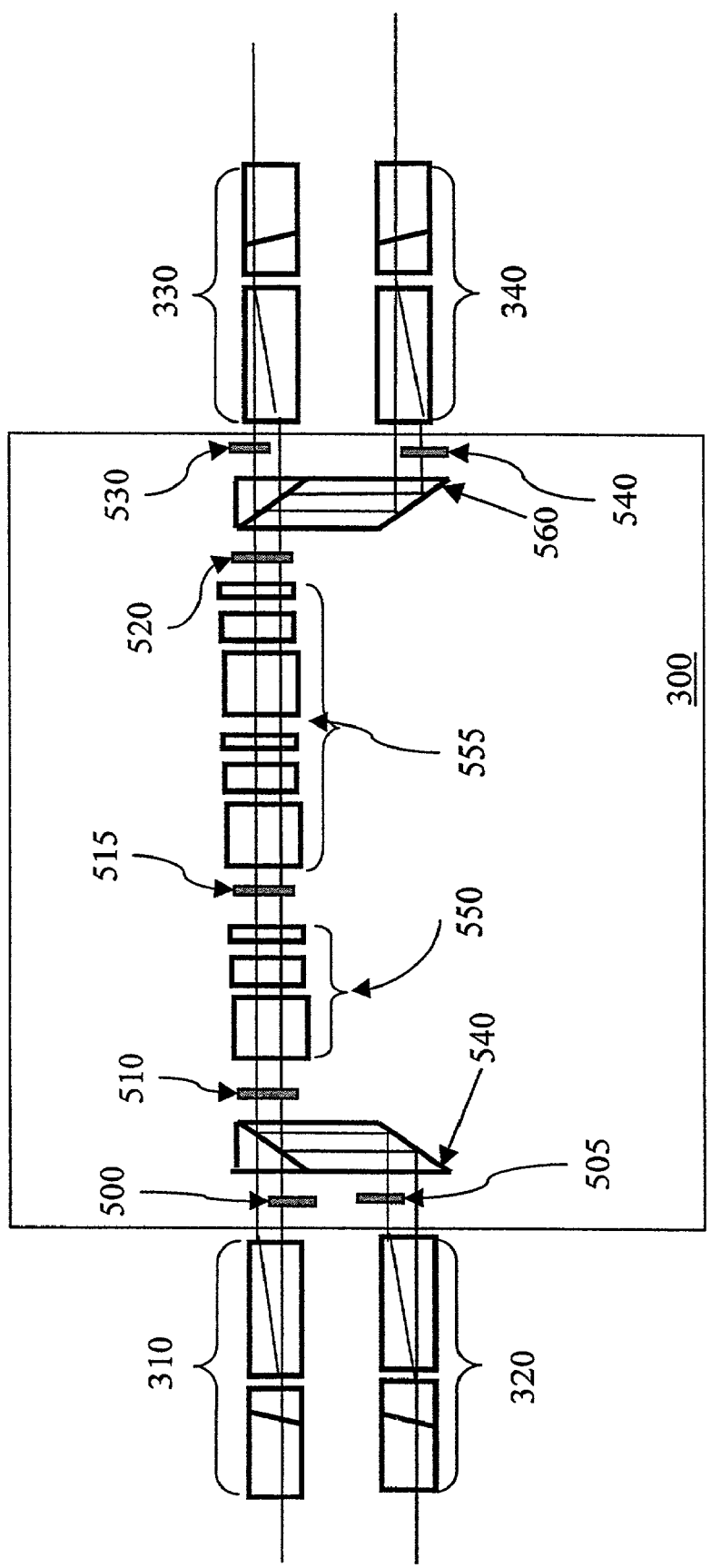
FIG. 5 illustrates one embodiment of a wavelength interleaving cross-connect having multiple half wave plates and two birefringent elements.

FIG. 5 illustrates one embodiment of a wavelength interleaving cross-connect having multiple half wave plates and two birefringent elements. The elements of FIG. 5, with the exception of I/O ports 310, 320, 330 and 340, represent one embodiment of wavelength interleaving cross connect 300.

In general, odd channels received via port 310 are directed to port 330, and even channels received via port 310 are directed to port 340. Odd channels received via port 320 are directed to port 340, and even channels received via port 320 are directed to port 330. In one embodiment, to operate as described above with respect to FIGS. 3 and 4 odd channels are input to port 310 and even channels are input to port 320. In an alternate embodiment, even channels are input to port 310 and odd channels are input to port 320.

The half wave plate 510, a first birefringent element 550, a half wave plate 515, a second birefringent element 555, and a half wave plate 520 together operate as a filtering element to filter optical signals that pass therethrough. In one embodiment, the first birefringent element 550 has an optical path length of L and the second birefringent element 555 has an optical path length of 2L. In one embodiment, the filtering effect of half wave plates 510 (e.g. @ 22.5°), 515 (e.g. @ 52.5°) and 520 (e.g. @ 3.5°) and of birefringent elements 550 and 555 provides a comb function in both directions; however, other filtering functions can also be provided. Preferably, the polarization of a first set of frequencies (e.g. ITU even channels) is rotated by 90°, while the polarization of a second set of frequencies (e.g. ITU odd channels) is unaffected. This difference in response typically provides the opportunity for the odd and even numbered channels launched via the same input port to be directed to different ports; however, in the present invention it also enables the odd and even numbered channels launched via different input ports to be directed to the same output port. Of course, all of this depends on the relative polarizations of the odd and even channels when they are input into the device, and how their polarizations are otherwise manipulated within the system.

In one embodiment, the first and second birefringent elements 550 and 555 are composed of multiple birefringent crystals that are selected to provide improved thermal stability over a range of operating temperatures as compared to a single birefringent crystal. In one embodiment, one crystal is a $TiO_2$ crystal and a second crystal is a $YVO_4$ crystal; however, other crystal types can also be used. Other birefringent assemblies can also be used, for example, a single crystal can be used if temperature stability is not important.

For the sake of example we will assume that the even numbered channels, are input the port 320 and the odd numbered channels are input the port 310. The components of the optical signal comprising even numbered channels launched via port 320 emerge from the half wave plate 520 in the orthogonal polarization state as when they entered half wave plate 510, and therefore pass through a polarization beam splitter 560 to a half wave plate 530 and to the port 330. Assuming that the port 330 is optically coupled to port 340 via an optical device of some kind, the even channels received via the port 340 will travel through the cross-connect 300 in a similar manner; however, a waveplate 540 is used to ensure that the polarization of the even channel components beginning the second pass is orthogonal to their polarization after the first pass. Accordingly, the even channels will get reflected by the prism 560 and directed to the waveplate 520. Once again, passage through the first and second birefringent elements 550 and 555 results in a polarization rotation enabling the even channel components to pass through the prism 540 to the port 310.

Moreover, it is preferable for the signals that pass in a first direction (e.g. left to right) to exit the waveplate 520 with a polarization that is orthogonal to the signals of the same frequency set re-entering the waveplate 520 for a second pass in a second direction (e.g. right to left). The orthogonal relationship between the passes reduces, or even eliminates chromatic dispersion for signals that are passed from the port 310 to the port 330, through an optical device to the port 340 and then to the port 320.

One of the components (e.g. the ordinary component) of the odd numbered channels received via the port 310 is directed to the filtering elements through a half wave plate 500, which ensures that the polarization of the odd channel components is orthogonal to the polarization of the even channel components launched via the port 320, and that the components of the odd numbered channels are passed directly through the polarization beam splitter prism 540 to the waveplate 510. The polarization of the odd channels is unaffected as a result of passing through the filtering elements 550 and 555. Accordingly, the odd channels are directed to port 330 after passing directly through the polarization beam splitter 560. The half wave plate 530 rotates the polarization of one of the odd channel components, whereby they can be combined in a walk-off crystal provided in the port 330.

The odd channels received via the port 340 are processed in a similar manner as the odd channel signals launched via the port 310, except that the waveplate 540 rotates the polarization of one of the components thereof (e.g. extraordinary component) resulting in the odd channel components being reflected by the prism 560 and re-entering the waveplate 520 with a polarization orthogonal to the polarization of the odd channel components exiting the waveplate 520 after the first pass. As a result of passing through the first and second filtering elements 550 and 555 a second time, the polarization of the odd channel components is again unaffected, which enables the odd channel components to be reflected by the prism 540 to the port 320. As with the even channels described above, an orthogonal relationship between signals that pass in a first direction and in a second direction can reduce, or even eliminate, chromatic dispersion.

Figure 6:
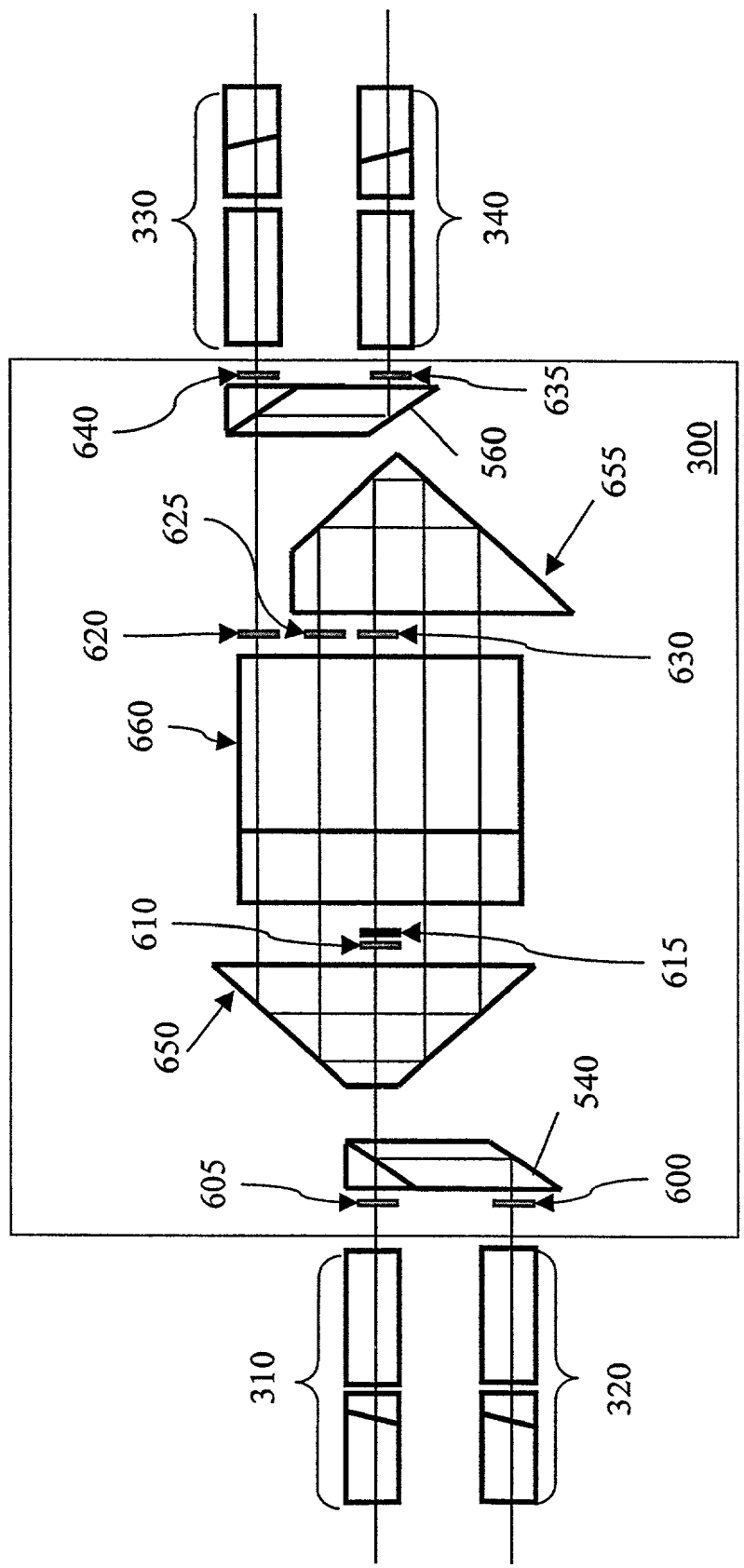
FIG. 6 illustrates one embodiment of a wavelength interleaving cross-connect having reflective elements to reflect optical signals through multiple half wave plates and a birefringent element.

FIG. 6 illustrates one embodiment of a wavelength interleaving cross-connect having reflective elements to reflect optical signals through multiple half wave plates and a birefringent element. The cross-connect of FIG. 6 provides a similar functionality as the cross-connect of FIG. 5; however, the cross-connect of FIG. 6 passes signals though a single birefringent element multiple times rather than through multiple birefringent elements.

Signals, received via the port 310, are spatially separated into horizontal and vertical components by a walk-off crystal within the port 310. One of the components passes through half wave plate 605 (e.g. extraordinary component), whereby when entering the polarization beam splitter prism 540, both components have the same polarization. Moreover, the waveplate 605 ensures that the signals coming from the port 310 have a state of polarization that enables them to pass directly through the polarization beam splitter 540.

Signals, received via the port 320, are spatially separated into horizontal and vertical components by a walk-off crystal within the port 320. One of the components (e.g. ordinary component) passes through half wave plate 600, whereby when entering the polarization beam splitter prism 540, both components have the same polarization, which is orthogonal to the polarization of the aforementioned components from the port 310. Moreover, the waveplate 600 ensures that the signals coming from the port 320 have a state of polarization that enables them to be reflected by the polarization beam splitter 540. Subsequently, all of the components pass through a hole in a reflective element 650. In one embodiment, reflective element 650 is a reflective prism; however, other components could also be used.

Reflective elements 650 and 655 reflect the signals through half wave plates 610, 620, 625 and 630, through a polarizer 615, and through a birefringent element 660 a plurality of times. The polarization of the components of the odd channel signals is unaffected by the multiple passes through the single birefringent element 660, while the polarization of the even channel signals is rotated by 90°. Accordingly, the odd channel components launched via the port 310 and the even channel components launched via the port 320 pass directly through the polarization beam splitter prism 560 to the port 330. Prior to entering the port 330 one of the components passes through half wave plate 640, which re-orients the one component orthogonal to the other. Alternatively, odd channel components launched via the port 320 and even channel components launched via the port 310 get reflected by the prism 560 to the port 340. As above, prior to entering the port 340 one of the components passes through half wave plate 635, which re-orients the one component orthogonal to the other The azimuth angles of the half wave plates and the birefringent element are chosen to provide the desired filtering functionality. Design of such filters is known in the art.

In one embodiment, birefringent element 660 is composed of multiple birefringent crystals that are selected to provide improved thermal stability over a range of operating temperatures as compared to a single birefringent crystal. In one embodiment, one crystal is a $TiO_2$ crystal and a second crystal is a $YVO_4$ crystal; however, other crystal types can also be used. Other birefringent assemblies can also be used, for example, a single crystal can be used if temperature stability is not important.

Assuming that the device of FIG. 6 defines the cross connect 300 of FIG. 3, odd channels launched via the port 310 exit via the port 330, and subsequently are received via port 340. The recently processed odd channels are passed through half wave plate 635, thereby ensuring that the polarization of both of the components is the same but orthogonal to the polarization of the odd channels exiting the waveplate 620. Accordingly, the polarization beam splitter 560 directs the odd channel components though the half wave plates, the polarizer and the birefringent element for a second time. After filtering, the odd channels, the polarization of which remains the same, are passed to port 320 through polarization beam splitter 540.

Even channels are routed in a similar manner from the port 320 to the port 330 and from the port 340 to the port 310, taking into account that the polarization of even channel signals is rotated by 90° each time they pass between waveplates 610 and 620. In one embodiment, signals that pass in a first direction (e.g., left to right) have a polarization that is orthogonal to signals of the same frequency set that pass in a second direction (e.g., right to left). The orthogonal relationship between the passes reduces, or even eliminates, chromatic dispersion for signals that are passed from port 310 to port 330, through and optical device to port 340 and then to port 320.

FIGS. 7a and 7b illustrate one embodiment of a wavelength interleaving cross-connect having all four ports on a common side and a reflective element to reflect optical signals through multiple half wave plates and multiple birefringent elements. The cross-connect of FIG. 7 provides a similar functionality as the cross-connect of FIG. 5; however, the cross-connect of FIG. 7 passes signals though multiple birefringent elements to a mirror and then back through the multiple birefringent elements. This arrangement ensures that the transmission between each set of ports is chromatic dispersion free.

An optical signal carrying odd channels is received via port 310, and is spatially separated into orthogonal sub-beams by a walk-off crystal provided therein. One of the sub-beams passes through a half wave plate 710, which ensures both sub-beams have the same polarization for passage through the device, e.g. horizontal. Both components enter a prism 725, which routes the signals through a half wave plate 730, a first birefringent element 735, a half wave plate 740, a second birefringent element 745 and a half wave plate 750. In a preferred embodiment, the first birefringent element 735 has an optical path length of L, and the second birefringent element 745 has an optical path length of 2L; however, other optical path lengths can also be used. The combination of the half wave plates 730, 740 and 750, and the first and second birefringent elements 735 and 745 operate to filter the optical signal, as desired. Preferably, the assembly also rotates the polarization of one of the subsets of channels (e.g. the even numbered ITU channels), while having no cumulative effect on the other subset of channels (e.g. the odd numbered ITU channels).

After emerging from the half wave plate 750, the odd channel components, still having their original polarization (horizontal), pass through walk-off crystal 755 to a quarter wave plate 760 and a mirror 770, which combine to direct the sub-beams with the first polarization from a lower level containing the port 310 to a middle level containing the ports 330 and 340. At this point, even numbered ITU wavelengths would have the second polarization, and get spilled off by the walk-off crystal 755. The quarter wave plate 760 is positioned to intersect the sub-beams and provide a polarization rotation of 45° for each pass therethrough. The mirror 770 reflects the optical signals back through quarter wave plate 760 for a second time resulting in a full 90° rotation of the sub-beams to the second polarization. Accordingly, the walk-off crystal 755 passes the sub-beams, during their second pass, upwardly towards the middle level. The sub-beams pass through to the half wave plate 750, the second birefringent element 745, the half wave plate 740, the first birefringent element 735 and the half wave plate 730 for a second pass with a polarization (e.g. vertical) orthogonal to the polarization during the first pass. The sub-beams pass through a polarization beam splitting prism 727, which passes light having vertical polarization to the port 330. Between the ports 330 and 340, the sub-beams are passed through an optical device of some kind, such as an amplifier or an add/drop multiplexer.

One of the odd channel sub-beams received via port 340 are passed through a half wave plate 700 to ensure both sub-beams have the original polarization (horizontal). Accordingly, both of the sub-beams are reflected by the polarization beams splitting prism 720 and through the half wave plate 730, the first birefringent element 735, the half wave plate 740, the second birefringent element 745, and the half wave plate 750 to the walk-off crystal 755. At this point, because the odd channel sub-beams still have their original polarization, the walk-off crystal 755 directs the sub-beams from the middle level up to the higher level containing the port 320. Again, the sub-beams pass through the quarter wave plate 760 to mirror 770, which reflects the sub-beams back through the quarter wave plate 760. As a result of the double pass through the quarter wave plate 760 the polarization of the sub-beams is rotated from their original polarization to an orthogonal polarization (vertical). The signals are then reflected back upwardly through the walk-off crystal 755 to the higher level and to the waveplate 750, the second birefringent element 745, the waveplate 740, the first birefringent element 745, and the waveplate 730. A prism 720, on the third level, reflects the sub-beams to the port 320. One of the sub-beams passes through a half wave plate 715, which enables the sub-beams containing the odd numbered channels to be combined and output the port 320.

The even channels are routed in a similar manner from port 320 to port 330 and from port 340 to port 310. The even channel sub-beams are launched via the port 320 on the upper level, and the half wave plate 715 ensures that both sub-beams have the same polarization (e.g. horizontal). Passage through the birefringent elements and associated waveplates results in a 90° rotation from the original polarization to an orthogonal polarization (vertical). Accordingly, the even channel sub-beams pass downwardly through the walk-off crystal 755 to the middle level before intersecting the quarter wave plate 760 and mirror 770. The quarter wave plate 760 rotates the even channel sub-beams back to their original polarization (horizontal), whereby the walk-off crystal directs them back along the middle level during the second pass therethrough. Again passage through the birefringent elements and associated waveplates results in another 90° rotation from the original polarization to an orthogonal polarization (vertical). As a result, the even channel sub-beams also pass directly through the polarization beams splitting prism 727 to the port 330. As above, when the even channel sub-beams re-enter the device via the port 340, the half wave plate 700 ensures that both sub-beams have the original polarization (horizontal). However, the polarization of the even channel sub-beams again is effected by passage through the birefringent elements and associated waveplates, which rotates their polarization from their original polarization to an orthogonal polarization (vertical). Accordingly, the walk-off crystal 755 passes the even channel sub-beams downwardly therethrough to the lower level and to the quarter wave plate 760 and mirror 770. The quarter wave plate 760 rotates the polarization of the sub-beams back to their original polarization (horizontal) enabling the walk-off crystal 755 to direct them back along the lower level. After yet another polarization rotation by the birefringent elements 735 and 745, the even channel sub-beams are directed to the port 310 for recombination, with the help of the waveplate 710.

In one embodiment, signals that pass in a first direction (e.g., left to right) have a polarization that is orthogonal to signals of the same frequency set that pass in a second direction (e.g., right to left). The orthogonal relationship between the passes reduces, or even eliminates, chromatic dispersion for signals that are passed from port 310 to port 330, through and optical device to port 340 and then to port 320 or vice versa.

Figure 8:
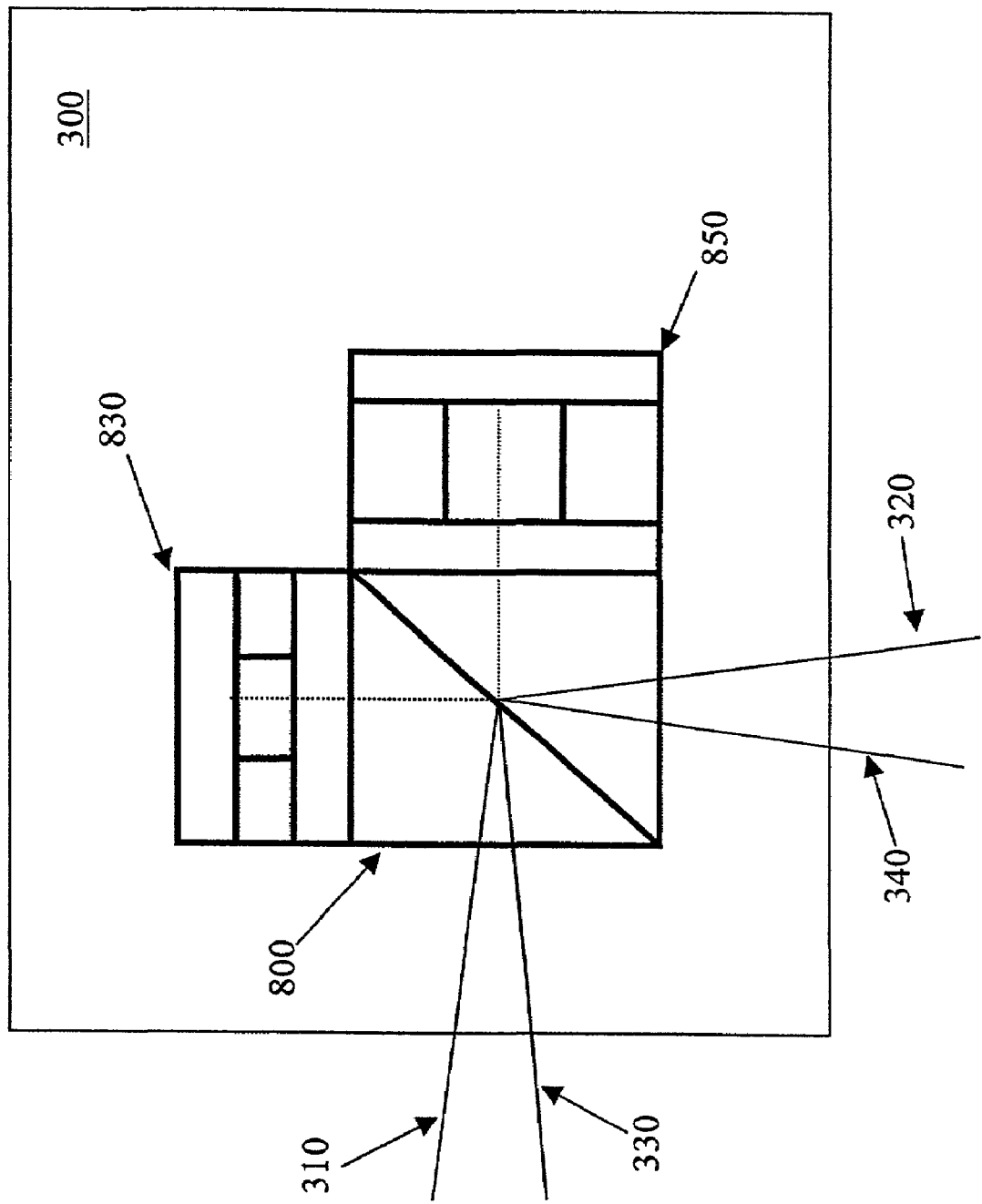
FIG. 8 illustrates one embodiment of a wavelength interleaving cross-connect having a polarization beam splitter and multiple etalons.

FIG. 8 illustrates one embodiment of a wavelength interleaving cross-connect having a beam splitter and multiple etalons. The cross-connect described includes a Fabry-Perot phase shifter (FPPS) providing phase shifting for an optical signal, and a Fabry-Perot etalon in a Michelson arrangement. The combination of the FPPS and the etalon provide sufficient passband width and isolation to operate as an interleaver/deinterleaver. A similar device is disclosed in U.S. Pat. No. 6,169,626 issued Jan. 2, 2001 to Chen et al, which is incorporated herein by reference.

In one embodiment, the components of cross-connect 300 are held in optical contact by atomic force rather than epoxy; however, epoxy can also be used. In order to maintain optical contact by atomic force, the thickness of each glass plate should be consistent within a predetermined tolerance. In one embodiment the thickness tolerance for each plate is 1.0 μm; however, other tolerances can also be used.

Because of the flatness of the components of the cross-connect 300, by abutting the components to each other, contact is maintained by atomic forces. In one embodiment, use of atomic force to maintain optical contact allows material matching to within 1.0 μm. As mentioned above, optical contact by atomic force also provides better thermal performance compared to use of epoxy to assemble optical components.

The beam splitter cube 800 splits the optical signal into a first sub-beam and a second sub-beam. In one embodiment, beam splitter cube 800 splits the beam evenly such that each etalon receives a 50% strength version of the input signal. In other words, beam splitter cube 800 is a 50/50 beam splitter. Other types of beam splitters can also be used. Because a precise 50/50 beam splitter is difficult to manufacture, other beam splitting ratios can also be used. In one embodiment, the two crystals of beam splitter 800 are maintained in optical contact by atomic force.

Assuming a 50/50 beam split by beam splitter cube 800, the first sub-beam is directed to etalon 830 and the second sub-beam is directed to FPPS 850. In one embodiment, front reflective material of etalon 830 reflects 0% to 10% of the signal directed to etalon 830 by beam splitter cube 800. In one embodiment, the gap between the front reflective material and the back reflective material is 0.75 mm; however, other gap sizes can also be used. The back reflective material reflects 90% to 100% of the signal passed by the front reflective material.

In one embodiment, etalon 830 is coupled to beam splitter cube 800 by optical contact. In such an embodiment, the gap between etalon 830 and beam splitter cube 800 can be less than 1.0 μm. In an alternate embodiment, etalon 830 is coupled to beam splitter cube 800 with epoxy; however, the gap between etalon 830 and beam splitter cube 800 is generally larger than when coupled by atomic force. In one embodiment, etalon 830 includes a tuning plate (not shown in FIG. 8). The tuning plate provides cross-connect 300 with fine resolution (e.g., 10 nm or less). The tuning plate provides fine tuning capability by changing the effective optical path length through etalon 830.

The second sub-beam is passed beam splitter cube 800 to FPPS 850. In one embodiment, the front reflective material reflects 15% to 20% of the second sub-beam directed to FPPS 540 by beam splitter cube 800. In one embodiment the gap between the front reflective material and the back reflective material is 1.5 mm; however, other gap sizes can also be used. The back reflective material reflects 90% to 100% of the signal passed by the front reflective material. The reflected second sub-beam is directed to the beam splitter cube interface and reflected to the appropriate port. In one embodiment, FPPS 850 is coupled to beam splitter cube 800 by atomic force. In an alternate embodiment, FPPS 850 is coupled to beam splitter cube 800 with epoxy.

Etalon 830 provides a linear phase difference and a sinusoidal transfer function for the first sub-beam. FPPS 850 provides a non-linear phase response with slight attenuation for the second sub-beam. The phase and intensity response of etalon 830 and FPPS 850 cause constructive and destructive light interference at the beam splitter cube interface. The frequencies for which constructive light interference occurs are passed at or near full intensity. The frequencies, for which destructive light interference occurs, results in attenuation of the optical signal.

This device is effectively the same as the aforementioned cross connects, whereby odd channels input the port 310 and even channels input the port 320 get output the port 330, while odd and even channels input the port 340 get output the ports 320 and 310, respectively.

Figure 9:
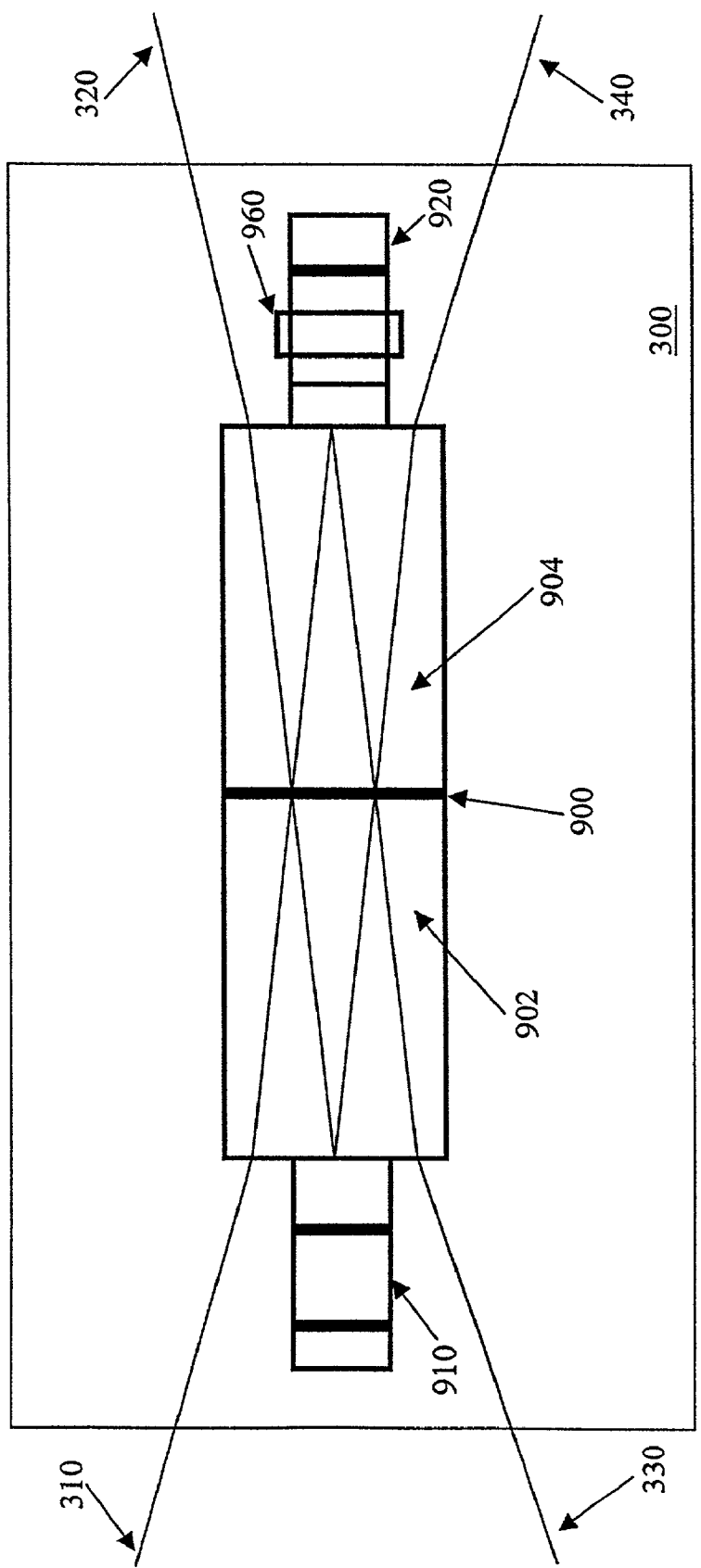
FIG. 9 illustrates certain dimensions for one embodiment of a Michelson phase shifter cross-connect with a contact plate splitter.

FIG. 9 illustrates certain dimensions for one embodiment of a Michelson phase shifter cross-connect in which the ports 310, 320, 330 and 340 are optically coupled with a contact plate splitter 900. In one embodiment, the air gap dimensions, the phase matching parameters and the design parameters are the same for the interleaver with the contact plate as with the interleaver with the beam splitter with the following exception:

$L_1 \approx L_2 \pm 0.5$ μm for a plate splitter embodiment.

In general, the cross-connect of FIG. 9 operates in a similar manner as the beam splitter cube cross-connect described above. In one embodiment, plate splitter 900 is a 50/50 beam splitter; however, other plate splitters can be used. In one embodiment crystals 902 and 904 are silica; however, other materials can also be used.

In one embodiment, FPPS 910 and etalon 920 are coupled to the contact plate splitter by atomic force. Coupling with atomic force allows the gaps between FPPS 910 and the contact plate splitter and between etalon 920 and the contact plate splitter to be less than 1.0 μm. In an alternate embodiment, FPPS 910 and etalon 920 are coupled to the contact plate splitter by epoxy. As mentioned above, coupling with atomic force improves both thermal and optical performance.

The optical signal passes through crystal 902 to plate splitter 900. In one embodiment, plate splitter passes 50% of the intensity of the optical signal and reflects the other 50% of the intensity of the optical signal. Thus, plate splitter 900 is a 50/50 plate splitter; however, other plate splitters can also be used.

The reflected optical signal passes through crystal 902 to FPPS 910. A phase-shifted version of the optical signal is reflected back to plate splitter 900. The transmitted optical signal passes through crystal 904 to etalon 920. A version of the optical signal having a linear phase difference is reflected back to plate splitter 900.

At plate splitter 900, the reflected signals converge and, through constructive and destructive interference, are separated into even and odd channels. In one embodiment, tuning plate 960 is used to fine-tune the phase characteristics of the cross-connect. In one embodiment, a ±0.01° adjustment to tuning plate 960 corresponds to a ±10 nm phase distance.

Figure 10:
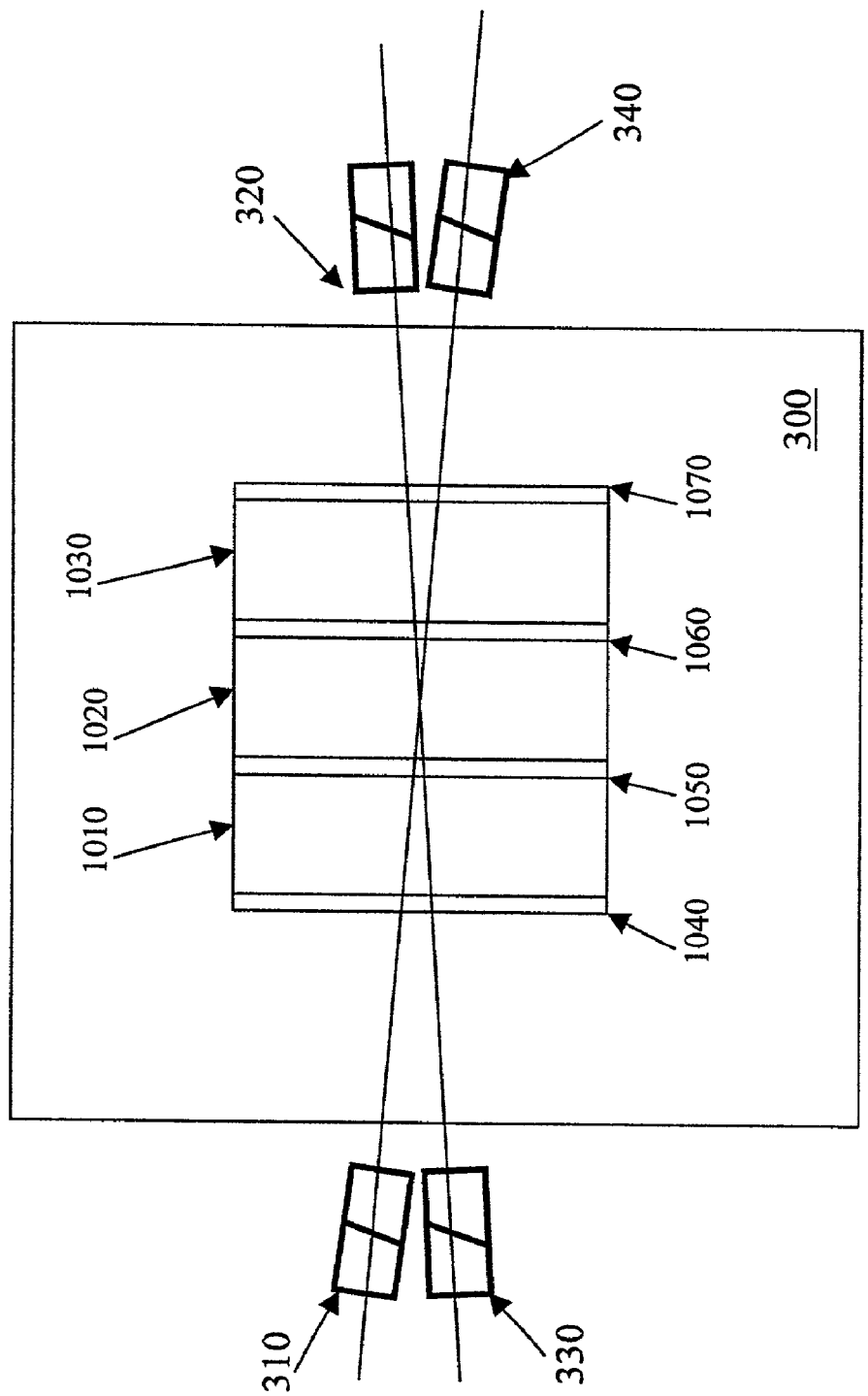
FIG. 10 illustrates one embodiment of a cross-connect using a multi-cavity etalon.

FIG. 10 illustrates one embodiment of a cross-connect having a multi-cavity etalon optical comb filter optically coupled to the ports 310, 320, 330 and 340. In order to provide filtering that is sufficiently accurate to provide comb-filtering functionality for International Telecommunications Union (ITU) channel spacing, the thickness of each glass plate should be consistent within a predetermined tolerance. In one embodiment the thickness tolerance for each plate is 1.0 μm; however, other tolerances can also be used.

In general, the comb filter cross-connect 300 includes glass plates 1010, 1020 and 1030. The comb filter cross-connect 300 also includes reflective coatings/materials 1040, 1050, 1060 and 1070. In one embodiment, the components of the comb filter cross-connect 300 are held in optical contact by atomic force rather than epoxy; however, epoxy can also be used. Because of the flatness of the components of the comb filter cross-connect 300, by abutting the components to each other, contact is maintained by atomic forces.

In one embodiment, the glass plates 1010, 1020 and 1030 are 0.5 mm thick for 100 GHz spaced input signals, 1.0 mm thick for 50 GHz spaced input signals, and 0.25 mm thick for 200 GHz spaced input signals. Other plate thicknesses can be used, for example, for other input signal spacings.

In one embodiment, reflective coatings/materials 1040 and 1070 have approximately the same reflectivity, and reflective coatings/materials 1050 and 1060 have approximately the same reflectivity, which is different than the reflectivity of coatings/materials 1040 and 1070. In one embodiment, the reflectivity of coatings/materials 1040 and 1070 is in the range of 20% to 30% reflective, and the reflectivity of coatings/materials 1050 and 1060 is in the range of 60% to 70% reflective. Other reflectivities can also be used, and multi-cavity etalons having more than three plates can also be used.

This device is effectively the same as the aforementioned cross connects, whereby odd channels input the port 310 and even channels input the port 320 get output the port 330, while odd and even channels input the port 340 get output the ports 320 and 310, respectively.

Figure 11:
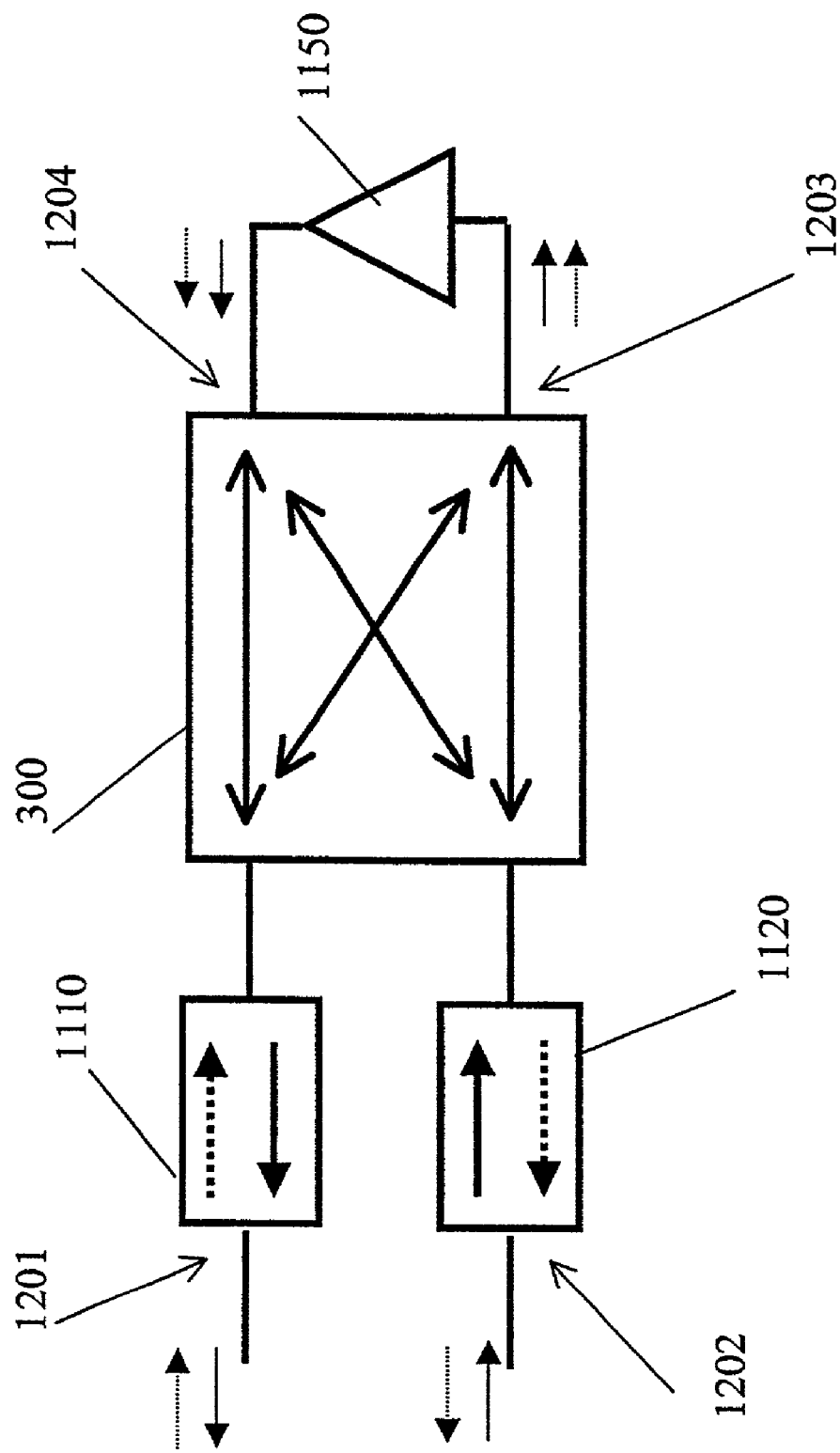
FIG. 11 is a block diagram representing the cross-connect of the present invention in combination with bidirectional isolators at the first and second ports for feeding signals traveling in opposite directions through an optical device in the same direction.

FIG. 11 schematically illustrates the bidirectional cross connect 300 according to the present invention in combination with a pair of bi-directional isolators 1110 and 1120 forming a uni-directional cross connect with double stage spectral isolation for use with an optical device 1150, e.g. an amplifier. The bidirectional isolators 1110 and 1120 are more thoroughly described in co-pending U.S. patent application Ser. No. 09/558,848 filed Apr. 27, 2000, which is incorporated herein by reference.

With reference to FIGS. 12a and 12b, a cross connect capable of fulfilling the scheme illustrated in FIG. 11 includes ports 1201, 1202, 1203 and 1204. Each port includes a lens 1210 fixed to a ferrule 1215, which surrounds a fiber 1220. To ensure that the device is polarization independent, each port also includes a walk-off crystal 1225 for dividing the input beams into orthogonally polarized sub-beams and/or for combining orthogonally polarized sub-beams for output. A half wave plate 1230 is provided for rotating the polarization of one of the sub-beams launched via the port 1201, so that both sub-beams have a first polarization (e.g. vertical). A half wave plate 1235 is provided for rotating the polarization of one of the sub-beams launched via the port 1202, so that both sub-beams have a second polarization (e.g. horizontal). Another half wave plate 1240 is provided at port 1203 for rotating the polarization of one of the outgoing sub-beams, so that the pair of outgoing sub-beams can be combined by walk-off crystal 1225. The port 1204 also includes a half wave plate 1245 for rotating one of the sub-beams of the light received via the optical device 1150 (FIG. 11) so that both of the sub-beams have the first polarization (e.g. vertical).

The remainder of the description of the device of FIG. 12 will be made with reference to FIG. 13. A signal comprised of wavelengths from a first set of wavelengths (e.g. even-numbered ITU channels), along with some unwanted wavelengths from a second set of wavelengths (e.g. odd-numbered ITU channels) is input the port 1201, and due to the walk-off crystal 1225 and the half wave plate 1230, becomes a first polarization (e.g. vertical). The signal passes through a non-reciprocal rotator 1250 comprised of a half wave plate 1251 and a Faraday rotator 1252. In the forward direction, i.e. left to right, the polarization rotations caused by the half wave plate 1251 and the Faraday rotator 1252 cancel each other out, and therefore have no effect on the polarization of the sub-beams in question. Subsequently, the sub-beams pass through a birefringent assembly 1255, preferably including a first birefringent element of length L and a second birefringent element of length 2L. The birefringent assembly selectively rotates the polarization of the second set of wavelengths (e.g. the odd-numbered ITU channels), while having no cumulative effect on the polarization of the first set of wavelengths (e.g. the even-numbered ITU channels). As a result, the polarization of the unwanted wavelengths from the second set of wavelengths in the signal is rotated, while the polarization of the wavelengths from the first set of wavelengths remains the same. This difference in polarization enables the unwanted wavelengths to be directed away from the remainder of the signal in a walk-off crystal 1260. The portion of the signal including wavelengths from the first set of wavelengths, which remained the first polarization (e.g. vertical), is passed directly through the walk-off crystal 1260, while the remainder is spilled off at an angle. The remaining signal is passed through another birefringent assembly 1265, preferably including a first birefringent element of length L and a second birefringent element of length 2L, which also has no effect on the polarization of the first set of wavelengths (e.g. even ITU channels). A walk-off crystal 1270 directs the sub-beams having the first polarization (e.g. vertical) to the port 1203.

Similarly, a signal comprising wavelengths from the second set of wavelengths (e.g. odd-numbered ITU channels), along with unwanted wavelengths from the first set of wavelengths, is input the port 1202 resulting in two sub-beams with the second polarization (e.g. horizontal). These sub-beams get directed by prism 1272 through the non-reciprocal rotator 1250, which has no effect on the polarization thereof, to the birefringent assembly 1255, which rotates the polarization of the wavelengths in the second set of wavelengths by 90° from the second polarization to the first polarization (e.g. to vertical), while leaving the polarization of the wavelengths in the first set of wavelengths unaffected, e.g. horizontal. A half wave plate 1280 is positioned in the path of the sub-beams from the port 1202 for rotating the polarization of all of the wavelengths by 90°, thereby making the unwanted wavelengths the first polarization (e.g. vertical), while making the remainder of the signal the second polarization (e.g. horizontal). Accordingly, the walk-off crystal 1260 spills off the unwanted light and directs the wavelengths from the second set of wavelengths with the second polarization through the birefringent assembly 1265, which rotates the polarization thereof from the second polarization to the first polarization (e.g. vertical). Since the sub-beams have the first polarization, the walk-off crystal 1270 directs them to the port 1203, as with the aforementioned sub-beams from the first set of wavelengths input the port 1201.

Figure 13:
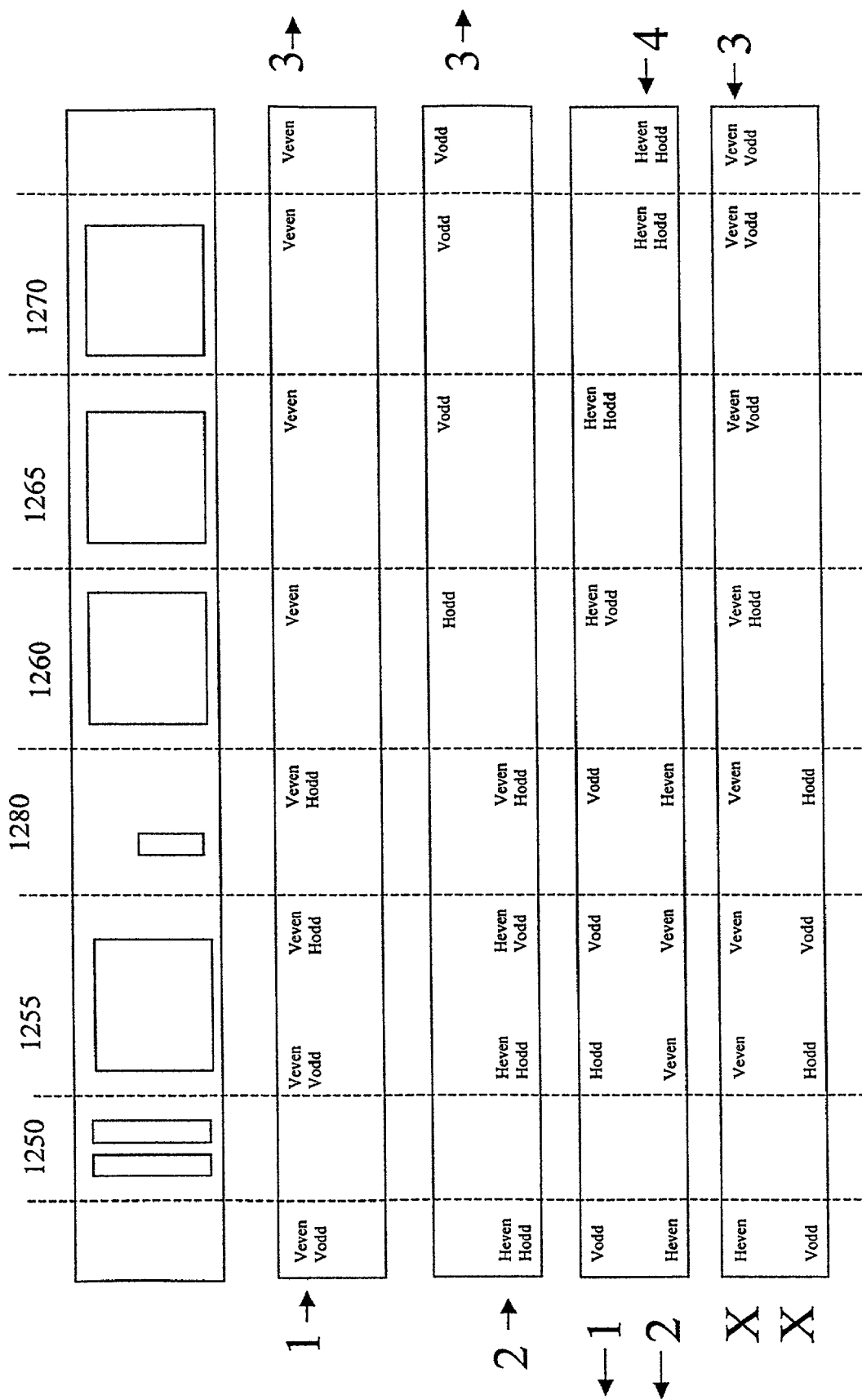
FIG. 13 is a polarization chart for the cross connect of FIGS. 12a and 12b.

Assuming that both sets of sub-beams, which were output the port 1203, get passed through an optical device 1150 (FIG. 11) and input the port 1204, we will describe their routes simultaneously will reference to the second last flow chart at the bottom of FIG. 13. Passage through the port 1204 results in either signal becoming two sub-beams with the second polarization (e.g. horizontal). To ensure minimal chromatic dispersion the polarization of the sub-beams re-entering the birefringent assembly 1265 is orthogonal to the polarization of the sub-beams exiting the birefringent assembly 1265. The sub-beams are directed through the walk-off crystal 1270 to the birefringent assembly 1265. Passage through the birefringent assembly 1265 results in the polarization of the wavelengths in the second set of wavelengths (e.g. odd channels) being rotated to the first polarization (e.g. vertical), while the polarization of the first set of wavelengths is unaffected. Accordingly, the sub-beams including wavelengths from the second set of wavelengths is passed directly through the walk-off crystal 1260 to the birefringent assembly, while the sub-beams including wavelengths from the first set of wavelengths is directed through the walk-off crystal 1260 along a different path to the half wave plate 1280. The half wave plate 1280 rotates the polarization of the sub-beams including wavelengths from the first set of wavelengths (e.g. even channels), whereby both sets of sub-beams have the first polarization entering the birefringent assembly 1255. Again, the birefringent assembly 1255 rotates the polarization of the second set of wavelengths, while having no cumulative effect on the polarization of the first set of wavelengths. In this direction, i.e. right to left, the non-reciprocal rotator 1250 rotates the polarization of all of the sub-beams by 90°. This last rotation ensures that the sub-beams have the proper polarization to be combined in the appropriate ports and output. If the polarization is not correct the sub-beams will be spilled off, as in the last flow chart, which charts the polarization of sub-beams launched into port 1203.

In the preferred embodiment illustrated in FIGS. 12*a* and 12*b*, the bi-directional isolators 1110 and 1120 of FIG. 11 are combined into a single unit including the non-reciprocal rotator 1250 and the birefringent assembly 1255.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

The invention claimed is:

1. A bi-directional cross-connect apparatus comprising:
    a first port;
    a second port;
    a third port;
    a fourth port; and
    routing means for directing signals comprising wavelength channels from a first subset of optical frequencies between the first port and the third port, and between the second port and the fourth port, and for directing signals comprising wavelength channels from a second set of optical frequencies, interleaved with the first subset of optical frequencies, between the first port and the fourth port, and between the second port and the third port;
    wherein the routing means comprises a birefringent crystal interleaver including a first birefringent element of length L, and a second birefringent element of length 2L, wherein crystal axes of the first and second birefringent elements are oriented differently; whereby the polarization of the wavelength channels in the first subset of optical frequencies is rotated by substantially 90°, while the polarization of the wavelength channels in the second subset of optical frequencies is substantially unchanged.

2. The apparatus according to claim 1, further comprising an optical device coupled between the third port and the fourth port, wherein the optical device is selected from the group consisting of a channel equalizer, an optical amplifier, an erbium doped fiber amplifier, and an Add/Drop multiplexer.

3. The apparatus according to claim 1, wherein the routing means includes an optical channel interleaver of the type selected from the group consisting of a birefringent crystal interleaver, a multi-cavity etalon interleaver, and a Michelson Gires Tournois intrerleaver.

4. The apparatus according to claim 1, wherein the routing means further comprises:
    first polarization beam splitter means for dividing signals launched via the first port into orthogonally polarized sub-beams, and for combining orthogonally polarized sub-beams launched via the third or fourth ports for output via the first port;

first polarization rotating means for ensuring both sub-beams exiting the first polarization beam splitter means have a first polarization, and for ensuring both sub-beams entering the first polarization beam splitter means have orthogonal polarizations;

second polarization beam splitter means for dividing signals launched via the second port into orthogonally polarized sub-beams, and for combining orthogonally polarized sub-beams launched via the third or fourth ports for output via the second port;

second polarization rotating means for ensuring both sub-beams exiting the second polarization beam splitter means have a second polarization, and for ensuring both sub-beams entering the second polarization beam splitter means have orthogonal polarizations;

third polarization beam splitter means for dividing signals launched via the third port into orthogonally polarized sub-beams, and for combining orthogonally polarized sub-beams launched via the first or second ports for output via the third port;

third polarization rotating means for ensuring both sub-beams exiting the third polarization beam splitter means have a first polarization, and for ensuring both sub-beams entering the third polarization beam splitter means have orthogonal polarizations;

fourth polarization beam splitter means for dividing signals launched via the fourth port into orthogonally polarized sub-beams, and for combining orthogonally polarized sub-beams launched via the first or second ports for output via the fourth port;

fourth polarization rotating means for ensuring both sub-beams exiting the fourth polarization beam splitter means have a second polarization, and for ensuring both sub-beams entering the fourth polarization beam splitter means have orthogonal polarizations;

first polarization dependent beam directing means for directing sub-beams between the first port and the birefringent crystal interleaver, and for directing sub-beams between the second port and the birefringent crystal interleaver; and second polarization dependent beam directing means for directing sub-beams between the birefringent crystal interleaver and the third port, and for directing sub-beams between the birefringent crystal interleaver and the fourth port.

5. A bi-directional cross-connect apparatus comprising:
a first port;
a second port;
a third port;
a fourth port; and
routing means for directing signals comprising wavelength channels from a first subset of optical frequencies between the first port and the third port, and between the second port and the fourth port, and for directing signals comprising wavelength channels from a second set of optical frequencies, interleaved with the first subset of optical frequencies, between the first port and the fourth port, and between the second port and the third port;
wherein the routing means comprises a birefringent crystal interleaver including a first birefringent element of length L, a second birefringent element of length 2L, and polarization rotators between the first and second birefringent elements; whereby the polarization of the wavelength channels in the first subset of optical frequencies is rotated by substantially 90°, while the polarization of the wavelength channels in the second subset of optical frequencies is substantially unchanged.

6. The apparatus according to claim 5, wherein the routing means further comprises:
first polarization beam splitter means for dividing signals launched via the first port into orthogonally polarized sub-beams, and for combining orthogonally polarized sub-beams launched via the third or fourth ports for output via the first port;

first polarization rotating means for ensuring both sub-beams exiting the first polarization beam splitter means have a first polarization, and for ensuring both sub-beams entering the first polarization beam splitter means have orthogonal polarizations;

second polarization beam splitter means for dividing signals launched via the second port into orthogonally polarized sub-beams, and for combining orthogonally polarized sub-beams launched via the third or fourth ports for output via the second port;

second polarization rotating means for ensuring both sub-beams exiting the second polarization beam splitter means have a second polarization, and for ensuring both sub-beams entering the second polarization beam splitter means have orthogonal polarizations;

third polarization beam splitter means for dividing signals launched via the third port into orthogonally polarized sub-beams, and for combining orthogonally polarized sub-beams launched via the first or second ports for output via the third port;

third polarization rotating means for ensuring both sub-beams exiting the third polarization beam splitter means have a first polarization, and for ensuring both sub-beams entering the third polarization beam splitter means have orthogonal polarizations;

fourth polarization beam splitter means for dividing signals launched via the fourth port into orthogonally polarized sub-beams, and for combining orthogonally polarized sub-beams launched via the first or second ports for output via the fourth port;

fourth polarization rotating means for ensuring both sub-beams exiting the fourth polarization beam splitter means have a second polarization, and for ensuring both sub-beams entering the fourth polarization beam splitter means have orthogonal polarizations;

first polarization dependent beam directing means for directing sub-beams between the first port and the birefringent crystal interleaver, and for directing sub-beams between the second port and the birefringent crystal interleaver; and second polarization dependent beam directing means for directing sub-beams between the birefringent crystal interleaver and the third port, and for directing sub-beams between the birefringent crystal interleaver and the fourth port.

7. The apparatus according to claim 5, further comprising:
first bi-directional isolator means between the first port and the routing means for passing first signals comprising wavelength channels from a first subset of optical frequencies, while preventing wavelength channels from a second subset of optical frequencies from passing therebetween; and second bi-directional isolator means between the second port and the routing means for passing second signals comprising wavelength channels from the second subset of optical frequencies, while preventing wavelength channels from the first subset of optical frequencies from passing therebetween;

whereby the first and second signals are routed from the first and second ports, respectively, to the third port, and routed from the fourth port to the second and first ports, respectively.

8. The apparatus according to claim 7, wherein the first and second bi-directional isolator means comprise:
   wavelength selective polarization rotating means for rotating the polarization of the first subset of optical frequencies, while have no substantial cumulative effect on the polarization of the second subset of optical frequencies;
   non-reciprocal polarization rotating means for rotating the polarization of the signals passing from the third or fourth ports to the first or second ports, while having substantially no cumulative effect on the polarization of signals passing in the opposite direction.

9. A bi-directional cross-connect apparatus comprising:
   a first port;
   a second port;
   a third port;
   a fourth port; and
   routing means for directing signals comprising wavelength channels from a first subset of optical frequencies between the first port and the third port, and between the second port and the fourth port, and for directing signals comprising wavelength channels from a second set of optical frequencies, interleaved with the first subset of optical frequencies, between the first port and the fourth port, and between the second port and the third port;
   wherein the routing means comprises a birefringent crystal interleaver including:
   a first birefringent element of length L;
   reflecting means for directing signals through the first birefringent element for a plurality of passes; and
   polarization rotating means for rotating the polarization of the signals after at least one of the passes;
   whereby the polarization of the wavelength channels in the first subset of optical frequencies is rotated by substantially 90°, while the polarization of the wavelength channels in the second subset of optical frequencies is substantially unchanged.

10. The apparatus according to claim 9, wherein the routing means further comprises:
    first polarization beam splitter means for dividing signals launched via the first port into orthogonally polarized sub-beams, and for combining orthogonally polarized sub-beams launched via the third or fourth ports for output via the first port;
    first polarization rotating means for ensuring both sub-beams exiting the first polarization beam splitter means have a first polarization, and for ensuring both sub-beams entering the first polarization beam splitter means have orthogonal polarizations;
    second polarization beam splitter means for dividing signals launched via the second port into orthogonally polarized sub-beams, and for combining orthogonally polarized sub-beams launched via the third or fourth ports for output via the second port;
    second polarization rotating means for ensuring both sub-beams exiting the second polarization beam splitter means have a second polarization, and for ensuring both sub-beams entering the second polarization beam splitter means have orthogonal polarizations;
    third polarization beam splitter means for dividing signals launched via the third port into orthogonally polarized sub-beams, and for combining orthogonally polarized sub-beams launched via the first or second ports for output via the third port;
    third polarization rotating means for ensuring both sub-beams exiting the third polarization beam splitter means have a first polarization, and for ensuring both sub-beams entering the third polarization beam splitter means have orthogonal polarizations;
    fourth polarization beam splitter means for dividing signals launched via the fourth port into orthogonally polarized sub-beams, and for combining orthogonally polarized sub-beams launched via the first or second ports for output via the fourth port; f
    ourth polarization rotating means for ensuring both sub-beams exiting the fourth polarization beam splitter means have a second polarization, and for ensuring both sub-beams entering the fourth polarization beam splitter means have orthogonal polarizations;
    first polarization dependent beam directing means for directing sub-beams between the first port and the birefringent crystal interleaver, and for directing sub-beams between the second port and the birefringent crystal interleaver; and
    second polarization dependent beam directing means for directing sub-beams between the birefringent crystal interleaver and the third port, and for directing sub-beams between the birefringent crystal interleaver and the fourth port.

11. A bi-directional cross-connect apparatus comprising:
    a first port;
    a second port;
    a third port;
    a fourth port;
    routing means for directing signals comprising wavelength channels from a first subset of optical frequencies between the first port and the third port, and between the second port and the fourth port, and for directing signals comprising wavelength channels from a second set of optical frequencies, interleaved with the first subset of optical frequencies, between the first port and the fourth port, and between the second port and the third port;
    first bi-directional isolator means between the first port and the routing means for passing first signals comprising wavelength channels from a first subset of optical frequencies, while preventing wavelength channels from a second subset of optical frequencies from passing therebetween; and
    second bi-directional isolator means between the second port and the routing means for passing second signals comprising wavelength channels from the second subset of optical frequencies, while preventing wavelength channels from the first subset of optical frequencies from passing therebetween; whereby the first and second signals are routed from the first and second ports, respectively, to the third port, and routed from the fourth port to the second and first ports, respectively.

12. The apparatus according to claim 11, wherein the first and second bi-directional isolator means comprise:
    wavelength selective polarization rotating means for rotating the polarization of the first subset of optical frequencies, while have no substantial cumulative effect on the polarization of the second subset of optical frequencies;

non-reciprocal polarization rotating means for rotating the polarization of the signals passing from the third or fourth ports to the first or second ports, while having substantially no cumulative effect on the polarization of signals passing in the opposite direction.

13. A cross-connect apparatus comprising:
a first port;
a second port;
a third port;
a fourth port;
first routing means for directing first signals comprising wavelength channels from a first subset of optical frequencies from the first port to the third port, and from the fourth port to the second port; and
second routing means for directing signals comprising wavelength channels from a second set of optical frequencies, interleaved with the first subset of optical frequencies, from the second port to the third port, and from the fourth port to the first port;
wherein each of the first and second routing means includes an optical channel interleaver including a first birefringent element of length L, a second birefringent element of length 2L; and
wherein polarization rotators are disposed between the first and second birefringent elements or the crystal axes of the first and second birefringent elements are oriented differently.

14. The apparatus according to claim 13, wherein the first and second routing means comprise:
first polarization beam splitter means for dividing the first signals launched via the first port into orthogonally polarized sub-beams, and for combining orthogonally polarized sub-beams launched via the fourth port for output via the first port;
first polarization rotating means for ensuring both sub-beams exiting the first polarization beam splitter means have a first polarization, and for ensuring both sub-beams entering the first polarization beam splitter means have orthogonal polarizations;
second polarization beam splitter means for dividing the second signals launched via the second port into orthogonally polarized sub-beams, and for combining orthogonally polarized sub-beams launched via the fourth port for output via the second port;
second polarization rotating means for ensuring both sub-beams exiting the second polarization beam splitter means have the first polarization, and for ensuring both sub-beams entering the second polarization beam splitter means have orthogonal polarizations;
third polarization beam splitter means for combining orthogonally polarized sub-beams launched via the first or second ports for output via the third port;
third polarization rotating means for ensuring both sub-beams entering the third polarization beam splitter means have orthogonal polarizations;
fourth polarization beam splitter means for dividing signals launched via the fourth port into orthogonally polarized sub-beams;
fourth polarization rotating means for ensuring both sub-beams exiting the fourth polarization beam splitter means have the first polarization;
birefringent crystal interleaver means receiving the first and second signals from the first and second ports, respectively, for rotating the polarization of the first signals by 90°, while having no cumulative effect on the polarization of the second signals; and
polarization dependent beam directing means for directing sub-beams from the first and second ports to the third port, and for directing sub-beams from the fourth port to the first and second ports.

15. The apparatus according to claim 14, wherein the polarization dependent beam directing means comprises a walk-off crystal, which receives the first signals from the first port at a first level, the second signals from the second port at a second level, and the first and second signals from the fourth port at a third level;
rotating means for rotating the polarization of the first and second signals by 90° after a first pass through the walk-off crystal; and
reflecting means for directing the first and second signals back through the walk-off crystal and back through the birefringent crystal interleaver for a second pass; whereby the first signal from the first port and the second signal from the second port are directed to the third port on the third level; and
whereby the first and second signals from the fourth port are directed to the second port on the second level and the first port on the first level, respectively.

16. The apparatus according to claim 13 further comprising an optical device coupled between the third port and the fourth port, wherein the optical device is selected from the group consisting of a channel equalizer, an optical amplifier, an erbium doped fiber amplifier, and an Add/Drop multiplexer.

* * * * *